United States Patent
Katayama et al.

(10) Patent No.: US 6,401,761 B1
(45) Date of Patent: Jun. 11, 2002

(54) HYDROGEN FUEL HOSE

(75) Inventors: Kazutaka Katayama; Motoshige Hibino; Ayumu Ikemoto, all of Komaki (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/953,265

(22) Filed: Sep. 17, 2001

(30) Foreign Application Priority Data

Sep. 20, 2000 (JP) ........................................ 2000-284969

(51) Int. Cl.$^7$ ................................................. F16L 11/04
(52) U.S. Cl. ...................... 138/138; 138/143; 138/146; 138/DIG. 7
(58) Field of Search .................................. 138/138, 143, 138/145, 146, 137, 140, 141, DIG. 7

(56) References Cited

U.S. PATENT DOCUMENTS

| | | | |
|---|---|---|---|
| 4,198,382 A | * | 4/1980 | Matsui et al. ............... 264/29.1 |
| 4,225,569 A | * | 9/1980 | Matsui et al. ............... 264/29.1 |
| 5,141,642 A | * | 8/1992 | Kusuki et al. ............... 210/490 |
| 6,074,717 A | * | 6/2000 | Little et al. ................. 138/133 |
| 6,316,126 B1 | * | 11/2001 | Hasegawa et al. .......... 138/140 |

FOREIGN PATENT DOCUMENTS

| | | |
|---|---|---|
| JP | 07-275981 | 10/1995 |
| JP | 08-127101 | 5/1996 |

* cited by examiner

*Primary Examiner*—Patrick Brinson
(74) *Attorney, Agent, or Firm*—Jacobson Holman, PLLC

(57) ABSTRACT

A hydrogen fuel hose having a wall composed of an inner resin layer, a thin metal layer and an outer resin layer. The inner resin layer includes at least a layer of low gas permeability and may further include a layer of low water permeability surrounded by the layer of low gas permeability. The hose may have a corrugated wall portion. The hose is suited for use as a hydrogen fuel hose for a fuel-cell vehicle because of its excellent hydrogen gas impermeability, resistance to embrittlement by hydrogen and hose flexibility.

20 Claims, 1 Drawing Sheet

HYDROGEN FUEL HOSE

BACKGROUND OF THE INVENTION

1. Field of the Invention

This invention relates to a hydrogen fuel hose. More particularly, it relates to a hydrogen fuel hose which can overcome various problems such as the embrittlement of its wall material by hydrogen, the effects of steam on a hose in a fuel-cell vehicle and the extraction of a substance which is a catalyst poison in a fuel cell, and a fuel hose which has a high impermeability to hydrogen gas and flexibility as well.

2. Description of the Related Art

The development of a fuel-cell vehicle as a next-generation vehicle is under way since the problems such as environmental pollution and oil shortage have been spotlighted. Hydrogen gas is a typical fuel for it. Methanol, methane, etc. can also be used if a reformer is available to generate hydrogen. Further, attention has also been paid to dimethyl ether as a clean fuel for a diesel engine. Dimethyl ether has a high conversion efficiency as a hydrogen supply source since it is easily liguefied under pressure.

Hydrogen gas requires careful handling because of its high permeability and combustibility. Hydrogen gas is still difficult to use independently as fuel, and is usually used with hot steam. Steam is a source of water for an electrolyte membrane for achieving an improved efficiency of power generation, or a source of hydrogen for a fuel cell of the type relying upon the reforming of a hydrocarbon, such as methane.

A metal tube, such as a stainless steel tube having a large wall thickness, is a typical hydrogen fuel hose to avoid problems including embrittlement by hydrogen. A metal tube is also considered effective for methanol, methane, etc. to avoid the problems of corrosion and fuel permeation. A metal tube having a thick wall of high rigidity, however, is not desirable as a hydrogen fuel hose for a fuel-cell vehicle. Such a tube is contrary to the requirements for a reduction of vehicle weight and fuel consumption, cannot absorb the vibration of a running vehicle satisfactorily, and restricts freedom in piping layout. A mere reduction in wall thickness of a metal tube is not desirable, either, since it becomes lower in strength and pressure resistance, and more liable to corrosion by exposure to hot steam, or embrittlement by hydrogen.

According to Japanese Patent Application Laid-Open No. 275981/1995, a straight metal pipe is coated with a resin layer by thermal shrinkage or extrusion, and then the pipe is corrugated. The corrugated pipe is useful for the absorption of vibration and the ease of installation. Japanese Patent Application Laid-Open No. 127101/1996 discloses a pipe used for conveying hot water for bathing, room heating, etc. It is a metal pipe having an outer wall surface coated with a powder of a modified polyolefin resin and a polybutene resin. The resin coating is effective for maintaining the strength of the wall having a reduced thickness, or protecting the outer wall surface from corrosion.

Any of the known metal pipes, however, has its inner wall surface exposed to hydrogen fuel and hot steam, though its outer wall surface is protected by a resin layer. The embrittlement of the metal by hydrogen or its corrosion is likely to occur easily and thereby lower the strength of the wall. The dissolution of metal ions, etc. also occurs, which may cause the deterioration of the catalyst in a fuel cell by pollution. Moreover, the exposed metal surface is likely to spoil the electrical insulation of a fuel cell and cause a leak of electricity therefrom.

The researches by the inventors of this invention reveal that a layer of a modified polyolefin resin or a polybutene resin even if formed on the inner surface of a metal pipe is unsatisfactory as a hydrogen gas barrier, though it is satisfactory in waterproofness. Hydrogen gas passes through the resin layer and embrittles the metal wall.

Moreover, the prior art does not provide any effective suggestion about the design standards for the preparation of corrugated hoses from metal pipes. For example, there is no teaching about the standard for the flexibility of a hose which makes it capable of absorbing vibration effectively or easy to install, or the maximum metal wall thickness that is allowable for its flexibility, or the minimum resin layer thickness required for the satisfactory strength of the hose.

SUMMARY OF THE INVENTION

It is an object of this invention to provide an effective measure to overcome embrittlement by hydrogen as a problem peculiar to a hydrogen fuel hose in a fuel-cell vehicle. It is another object of this invention to provide an effective measure to avoid the influence of steam and the extraction of a catalyst poison as other peculiar problems. It is still another object of this invention to provide an effective measure to improve the hydrogen impermeability, flexibility and strength of a hose.

According to a first aspect of this invention, there is provided a hydrogen fuel hose having a wall comprising an inner resin layer, a thin metal layer and an outer resin layer, wherein the inner resin layer includes a layer of low gas permeability formed from a resin having a helium gas permeability not exceeding $10^{-9}$ cm$^3$·cm/cm$^2$·sec·cmHg at a temperature of 80° C.

The thin metal layer ensures the high hydrogen gas impermeability of the hose, as well as its flexibility. The inner resin layer ensures that no metal ion be dissolved from the metal layer, thereby preventing pollution deterioration of a fuel cell catalyst. The layer of low gas permeability in the inner resin layer ensures that the metal layer be kept away from a gaseous mixture of hydrogen and steam and thereby protected from corrosion. The inventors of this invention have found that it is possible to prevent any embrittlement of the metal layer by hydrogen if the layer of low gas permeability has a helium gas permeability within the range stated above. The outer resin layer improves the strength, durability, chipping resistance and electrical insulation of the hose.

According to a second aspect of this invention, the inner resin layer further includes a layer of low water permeability surrounded by the layer of low gas permeability and having a pure water permeability not exceeding 5 mg·mm/cm$^2$/day. Although the layer of low gas permeability is usually an effective hydrogen gas barrier, its performance may be somewhat lowered by water, and if water reaches the metal layer, its corrosion may be promoted. These problems can, however, be overcome by the layer of low water permeability, particularly if its pure water permeability falls within the range stated above.

According to a third aspect of this invention, the layers of low gas and water permeability are of a resin not containing any halogen. If any halogen were extracted f rom any such resin layer, it could be a strong poison causing the deterioration of the catalyst in a fuel cell.

According to a fourth aspect of this invention, the hose is corrugated at least along a part of its length and has an axial spring constant not exceeding 25 N/mm. The inventors have experimentally ascertained that a corrugated hose having an axial spring constant not exceeding 25 N/mm can absorb vibration satisfactorily and is easy to install.

According to a fifth aspect of this invention, the metal layer has a thickness of 20 to 300 µm. A metal layer having a thickness of less than 20 µm may fail to make an effective hydrogen gas barrier. A metal layer having a thickness over 300 µm may not produce any better result, but merely gives a hose having an undesirably heavy weight and an undesirably high spring constant.

According to a sixth aspect of this invention, the inner and outer resin layers have a total thickness B having the following relationship to the thickness A of the metal layer:

$$A:B=1:4 \text{ to } 1:50$$

This is the range in which the resin layers can reinforce the metal layer most effectively. The resin layers may be unsatisfactory for reinforcing purposes if B is less than four times as large as A. If B is over 50 times as large, however, the resin layers may not produce any better result, but merely give a hose having an undesirably heavy weight.

According to a seventh aspect of this invention, the inner and/or outer resin layer is of a resin having a volume specific resistance of at least $10^{10}$ Ω·cm. The inner and outer resin layers ensure the electrical insulation of the hose so that there may not occur any leak of electricity from the fuel cell through the hose, particularly if at least one of the resin layers is of a resin having a volume specific resistance within the range stated above.

According to an eighth aspect of this invention, the hose is characterized by at least one of the following features:

(1) The resin forming the layer of low water permeability is polypropylene (PP), acid-modified PP (e.g. maleic anhydride-modified PP), polyphenylene sulfide (PPS), polyamide 6T (PA6T), polyamide 9T (PA9T), polyamide 612 (PA612), polyethylene (PE), acid-modified PE (e.g. maleic anhydride-modified PE), polymethylpentene, polyether sulfide (PES), polyether ether ketone (PEEK) or a copolymer of m-xylylenediamine and adipic acid (MXD6);

(2) The resin forming the layer of low gas permeability is an ethylene-vinyl alcohol copolymer (EVOH), polybutylene naphthalate (PBN), polyamide 6 (PA6), a polyamide 6-polyamide 66 copolymer (PA6-66), a PA6 or PA6-66 nanocomposite, PA6T, PA9T, PA612, polyamide 46 (PA46), PPS, PES or MXD6;

(3) The metal layer is of stainless steel, iron, an iron alloy, aluminum, an aluminum alloy, copper, a copper alloy nickel or a nickel alloy; and (4) The resin forming the outer resin layer is PP, acid-modified PP, PPS, polyamide 12 (PA12), polyamide 11 (PA11), linear low-density polyethylene (LLDPE), high-density polyethylene (HDPE), PA6T, PE, acid-modified PE, PA9T, PA612, PA912, PES, PEEK or MXD6.

The eighth aspect of this invention provides preferable examples of materials for the layer of low water permeability, the layer of low gas permeability, the metal layer and the outer resin layer.

The above and other features and advantages of this invention will become more apparent from the following description and the accompanying drawings.

DETAILED DESCRIPTION OF THE INVENTION

Hydrogen Fuel Hose

Figure 1A:
FIGS. 1A to 1D are a series of schematic diagrams showing a process for manufacturing a hydrogen fuel hose embodying this invention.

The hydrogen fuel hose according to this invention is preferably used for conveying a hydrogen fuel in a fuel-cell vehicle. It is, however, also useful for other fuel. It can, for example, be used as an automobile fuel (gasoline) hose or a filler hose. It can also be used as a hose for hydrogen gas or methanol in a fuel-cell vehicle. It can also be used as a domestic fuel hose as for gasoline, alcohol, hydrogen gas, or natural or propane gas. It is also suitable as a hose for pure water, since it does not allow any metal or halogen ion to be extracted therefrom.

The hose has a multilayer wall comprising at least an inner resin layer, a thin metal layer and an outer resin layer, though it may further include another layer or layers. It may be of any of a variety of shapes. It maybe a straight or curved hose. It may be corrugated along at least a part of its length and have a straight or curved portion or portions along the rest thereof.

A corrugated hose is, among others, preferred for its flexibility and ease of installation. It preferably has an axial spring constant not exceeding 25 N/mm. Its spring constant is variable by altering, for example, the thickness of the metal layer, the difference between the inside and outside diameters of the corrugated portion, the number of ridges on the corrugated portion, or the thickness of each resin layer.

The hose may be of any size. If it is intended for conveying hydrogen gas, it preferably has an inside diameter of, say, 10 to 50 mm to convey the gas at an increased flow rate. Although it is not specifically limited in pressure resistance, it preferably has a pressure resistance of, say, 1.5 MPa to convey gas at an elevated pressure and thereby at an increased flow rate.

Inner Resin Layer

The inner resin layer consists of at least a layer of low gas permeability and preferably includes also a layer of low water permeability surrounded by the layer of low gas permeability. The layer of low gas permeability is of a resin having a helium gas permeability not exceeding $10^{-9}$ cm$^3$·cm/cm$^2$·sec cmHg at a temperature of 80° C. Its gas permeability is defined by employing helium instead of hydrogen, so that it may be possible to avoid any possible hazard resulting from the use of hydrogen gas for any permeability test. The resin is preferably free from any halogen. Preferred examples of the resin are, therefore, EVOH, PBN, PA6, PA6-66, a PA6 or PA6-66 nanocomposite, PA6T, PA9T, PA612, PA46, PPS, PES and MXD6. The layer may have a thickness of, say, 100 to 200 µm, though its desirable thickness has to be so selected as to be suitable for its hydrogen gas impermeability, the flexibility of the hose and the reinforcement of the metal layer.

The layer of low water permeability may form the innermost wall layer of the hose to prevent any undesirable diffusion of water from steam to the layer of low gas permeability or the metal layer. It may be of any resin of low water permeability preferably having a pure water permeability not exceeding 5 mg·mm/cm$^2$/day. Moreover, the resin is preferably free from any halogen. Preferred examples of the resin are, therefore, PP, acid-modified PP, PPS, PA6T, PE, acid-modified PE, polymethylpentene, PA9T, PA612, PES, PEEK and MXD6. The layer may have a thickness of, say, 100 to 200 µm, though its desirable thickness has to be so selected as to be suitable for its water impermeability, the flexibility of the hose and the reinforcement of the metal layer.

The inner resin layer preferably has a certain level of electrical resistance. Therefore, the layer of low water or gas permeability is preferably formed from a resin having a volume specific resistance of at least $10^{10}$ Ω·cm. It is alternatively preferable for the inner resin layer to include a layer of a resin having a volume specific resistance of at least $10^{10}$ Ω·cm in addition to the layer of low water or gas permeability.

Thin Metal Layer

The metal layer is not particularly limited in construction, but may be prepared from, for example, a seamed or seamless metal tube (i.e. a welded or weldless metal tube), or a semi-seamed tube obtained by drawing a seamed tube (i.e. a welded tube). The layer is preferably of iron, an iron alloy, aluminum, an aluminum alloy, stainless steel, copper, a copper alloy, nickel or a nickel alloy. Stainless steel is, among others, preferred for its high strength and corrosion resistance.

The layer preferably has a thickness of, say, 20 to 300 μm, or more preferably 20 to 200 μm if the hose is corrugated.

A metal layer having a thickness of less than 20 μm may not have sufficient effects as a hydrogen gas barrier, while a metal layer having a thickness over 300 μm gives a hose having an undesirably heavy weight and an undesirably high spring constant.

Outer Resin Layer

The outer resin layer may be of any resin if it ensures the strength, durability, chipping resistance and electrical insulation of the hose. It is preferably of a resin having a volume specific resistance of at least $10^{10}$ Ω·cm as far as electrical insulation is concerned. Preferred examples of the resin are PP, acid-modified PP, PPS, PA12, PA11, LLDPE, HDPE, PA6T, PE, acid-modified PE, PA9T, PA612, PA912, PES, PEEK and MXD6. The layer may be formed from a single resin, or a plurality of resins each satisfying one of the requirements as stated above.

Layer Thickness Ratio

Although the preferred thicknesses of the individual wall layers of the hose have been stated above, it is preferable for the thickness A of the metal layer and the total thickness B of the inner and outer resin layers to have a ratio (A:B) ranging from 1:4 to 1:50 for the reasons stated before in connection with the sixth aspect of this invention. A more preferable ratio (A:B) ranges from 1:4 to 1:40.

Manufacturing Process

Any of a variety of known processes can be used for manufacturing a hydrogen fuel hose according to this invention. One process is shown in FIGS. 1A to 1D.

Figure 1B:
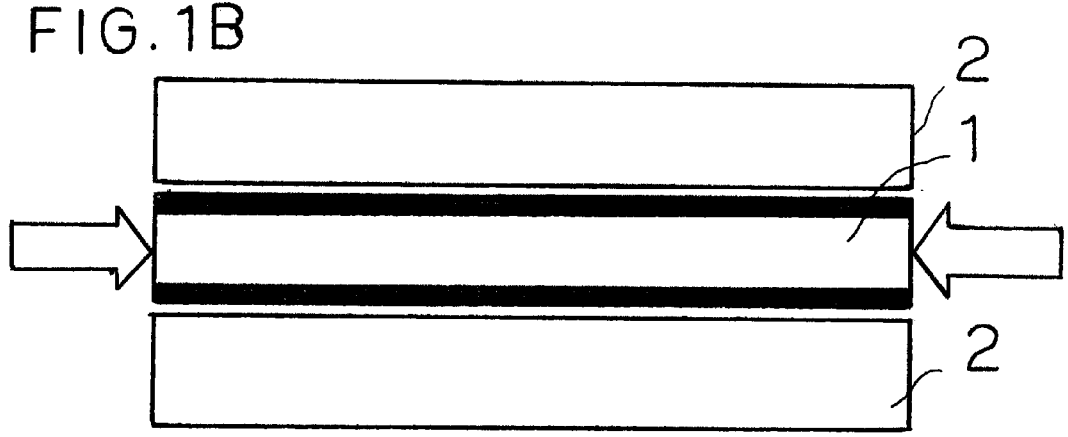
Figure 1C:
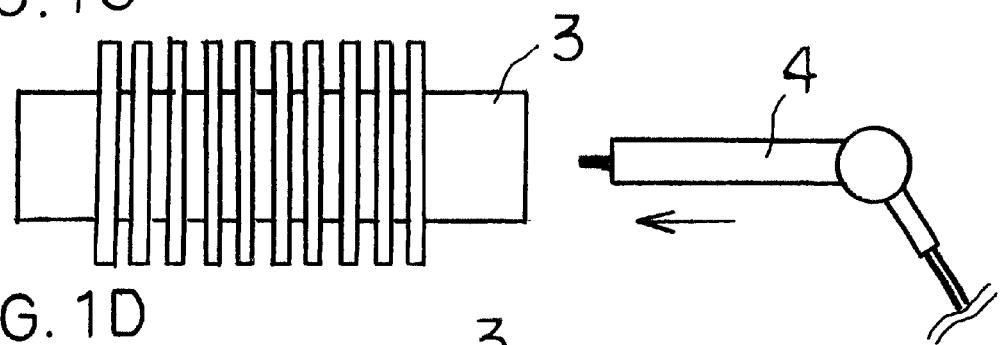
Figure 1D:
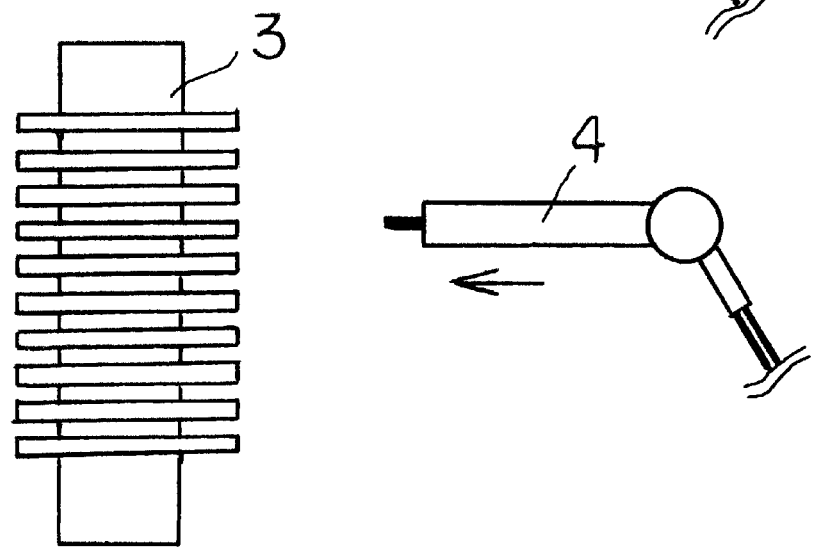

FIG. 1A shows a straight metal tube 1 prepared from an appropriate metallic material and having a small wall thickness. The metal tube 1 is subjected to hydroforming by a pair of dies 2 having corrugated cavities, as shown in FIG. 1B, whereby a corrugated metal tube 3 is made as shown in FIG. 1C. The corrugated metal tube 3 has its inner wall surface coated with a resin powder by an electrostatic coating gun 4 and heated to have an inner resin layer formed thereon, though not shown. If the inner resin layer is formed from a plurality of layers, such as a layer of low gas permeability and a layer of low water peremeability, the process is repeated to form one layer upon another. Then, the corrugated metal tube 3 has its outer wall surface coated with a resin powder by an electrostatic coating gun 4 to have an outer resin layer formed thereon, though not shown. The outer resin layer can also be formed from a plurality of layers as is the case with the inner resin layer.

EXAMPLES

Preparation of Hoses

Hoses having the structural features shown in Table 1 were prepared as Examples 1 to 5 of this invention.

TABLE 1

|  | Example 1 | Example 2 | Example 3 | Example 4 | Example 5 |
| --- | --- | --- | --- | --- | --- |
| Metal layer material | SUS304 | SUS304 | SUS304 | SUS304 | SUS304 |
| Metal layer thickness, μm | 120 | 120 | 120 | 20 | 200 |
| Corrugated portion - ID, mm - OD, mm - No. of ridges | 24/36/15 | 24/36/15 | 24/36/15 | 12/18/15 | 30/48/15 |
| Inner resin layer material | PPS | PPS | PP/AD/EVOH | PA6T | PP/AD/PBN |
| Inner resin layer thickness, μm | 200 | 150 | 100/20/100 | 200 | 100/20/150 |
| Outer resin layer material | PPS | LLDPE | PP | PA12 | LLDPE |
| Outer resin layer thickness, μm | 300 | 350 | 300 | 450 | 650 |
| Total resin layer thickness (B)/metal layer thickness (A) | 4.2 | 4.2 | 4.3 | 32.5 | 4.6 |
| Spring constant, N/mm | 6.0 | 5.8 | 6.3 | 12.9 | 6.5 |
| Vibration durability of hose filled with H$_2$ and steam | 1E6< | 1E6< | 1E6< | 1E6< | 1E6< |

Hoses having the structural features shown in Table 2 were prepared as Comparative Examples 1 and 2.

TABLE 2

|  | Comparative Example 1 | Comparative Example 2 |
| --- | --- | --- |
| Metal layer material | SUS304 | SUS304 |
| Metal layer thickness, μm | 120 | 350 |
| Corrugated portion - ID, mm - OD, mm - No. of ridges | 24/36/15 | 24/36/10 |
| Spring constant, N/mm | 2.5 | 93 |
| Vibration durability of hose filled with H$_2$ and steam | Cracked at 1E4 | 5E4 |

The hoses were prepared from straight tubes of SUS304 stainless steel having the wall thicknesses as shown in Tables 1 and 2. Each tube was hydroformed into a corrugated tube having the inside and outside diameters and the number of ridges as shown in Table 1 or 2.

Then, each of the corrugated metal tubes for Examples 1 to 5 had its inner and outer wall surfaces coated with a powder of the resin or resins as shown in Table 1 electrostatically and heated under the conditions as stated below to have an inner and an outer resin layer formed thereon with the thickness shown in Table 1. The heating conditions varied with the resin employed. The powder of the PPS resin was heated at 420° C. for 20 min., the powder of LLDPE at 170° C. for 15 min., the powder of EVOH at 200° C. for 10 min., the powder of maleic anhydride-modified PP (shown as AD, which means an adhesive) at 200° C. for 10 min., the powder of PP at 210° C. for 15 min., the powder of PA6T at 380° C. for 15 min., and the powder of PBN at 230° C. for 15 min. The inner resin layers for Examples 3 and 5 were formed by repeating the coating and heating process with three resins, PP/AD/EVOH and PP/AD/PBN, respectively.

Evaluation of HOSES

The corrugated hoses prepared as described above were evaluated for the following properties:

Spring Constant

Each hose was mounted on a strograph (Model V-10B of Toyo Seiki Seisakusho, Ltd.) and had its axial spring constant (N/mm) measured at a stroke of 10 mm. The result is shown in Table 1 or 2.

Vibration Durability

Preparatory Treatment—Each hose was closed tightly at one end, and fitted at the other end with a plug having a valve. Water was introduced into the hose through the valve to fill 10% of its capacity. The valve was also used for purging the hose with hydrogen gas having a pressure of 0.3 MPa by repeating the introduction of hydrogen gas therein and the removal of air therefrom. Then, the hose was subjected to 20 cycles of heat treatment in an explosion-proof type oven, each cycle consisting of 8 hours of heating at 80° C. and 16 hours of cooling at a normal room temperature.

Fatigue Test—A vibration fatigue test was conducted on each hose by using an oil pressure servo fatigue testing machine (tester) (Model FT-1 of Saginomiya Seisakusho, Inc.) The hose had one straight end portion thereof connected to a piston adapted to reciprocate diametrically of the hose, while the other straight end portion thereof was secured, and the hose was caused to oscillate within an angle of plus or minus 15 degrees at a frequency of 3 Hz.

The test results are shown in Tables 1 and 2. In Table 1, "1E6" means $1 \times 10^6$ as the number of oscillations and likewise, "5E4" in Table 2 means $5 \times 10^4$. In Table 1, "1E6<" means that the hose could withstand more than $1 \times 10^6$ oscillations. In Table 2, "Cracked" means that the hose cracked in the metal layer of its corrugated portion.

While the invention has been described by way of its preferred embodiments, it is to be understood that variations or modifications may be easily made by those skilled in the art without departing from the scope of this invention which is defined by the appended claims.

What is claimed is:

1. A hydrogen fuel hose having a wall comprising an inner resin layer, a thin metal layer and an outer resin layer, wherein the inner resin layer includes a layer of low gas permeability formed from a resin having a helium gas permeability not exceeding $10^{-9}$ cm$^3$·cm/cm$^2$·sec·cmHg at a temperature of 80° C.

2. The hose according to claim 1, which is a hose for use in a fuel-cell vehicle.

3. The hose according to claim 1, which is a hose for use in conveying gasoline, alcohol, natural gas or propane gas.

4. The hose according to claim 1, wherein the hose has a corrugated portion along at least a part of its length.

5. The hose according to claim 4, wherein the hose has an axial spring constant of 25 N/mm at the maximum.

6. The hose according to claim 1, wherein the hose is straight or curved.

7. The hose according to claim 1, wherein the hose has an inside diameter of 10 to 50 mm.

8. The hose according to claim 1, wherein the hose can withstand a pressure of 1.5 MPa.

9. The hose according to claim 1, wherein the thickness A of the metal layer and the total thickness B of the inner and outer resin layers have a ratio (A:B) ranging from 1:4 to 1:50.

10. The hose according to claim 1, wherein the inner resin layer further includes a layer of low water permeability surrounded by the layer of low gas permeability.

11. The hose according to claim 1, wherein the resin forming the layer of low gas permeability is selected from the group consisting of an ethylene-vinyl alcohol copolymer, polybutylene naphthalate, polyamide 6, a polyamide 6 and 66 copolymer, a polyamide 6 nanocomposite, a polyamide 6 and 66 nanocomposite, polyamide 6T, polyamide 9T, polyamide 612, polyamide 46, polyphenylene sulfide, polyether sulfide, and a copolymer of m-xylylenediamine and adipic acid.

12. The hose according to claim 1, wherein the layer of low gas permeability has a thickness of 100 to 200 μm.

13. The hose according to claim 10, wherein the layer of low water permeability has a pure water permeability of 5 mg·mm/cm$^2$/day at the maximum.

14. The hose according to claim 10, wherein the layer of low water permeability is of a resin selected from the group consisting of polypropylene, acid-modified polypropylene, polyphenylene sulfide, polyamide 6T, polyamide 9T, polyethylene, acid-modified polyethylene, polyamide 612, polymethylpentene, polyether sulfide, polyether ether ketone, and a copolymer of m-xylylenediamine and adipic acid.

15. The hose according to claim 10, wherein the layer of low water permeability has a thickness of 100 to 200 μm.

16. The hose according to claim 10, wherein at least one of the layer of low gas permeability and the layer of low water permeability has a volume specific resistance of at least $10^{10}$ Ω·cm.

17. The hose according to claim 10, wherein at least one of the layer of low gas permeability and the layer of low water permeability is of a resin which is free from any halogen.

18. The hose according to claim 1, wherein the metal layer has a thickness of 20 to 300 μm.

19. The hose according to claim 1, wherein the metal layer is of a metal selected from the group consisting of stainless steel, iron, an iron alloy, aluminum, an aluminum alloy, copper, a copper alloy, nickel and a nickel alloy.

20. The hose according to claim 1, wherein the outer resin layer is of a resin selected from the group consisting of polypropylene, acid-modified polypropylene, polyphenylene sulfide, polyamide 12, polyamide 11, linear low-density polyethylene, high-density polyethylene, polyamide 6T, polyethylene, acid-modified polyethylene, polyamide 9T, polyamide 612, polyamide 912, polyether sulfide, polyether ether ketone, and a copolymer of m-xylylenediamine and adipic acid.

* * * * *